Sept. 29, 1953 M. K. GOLDSTEIN 2,654,085
DETECTOR SYSTEM
Filed March 26, 1946 4 Sheets-Sheet 1
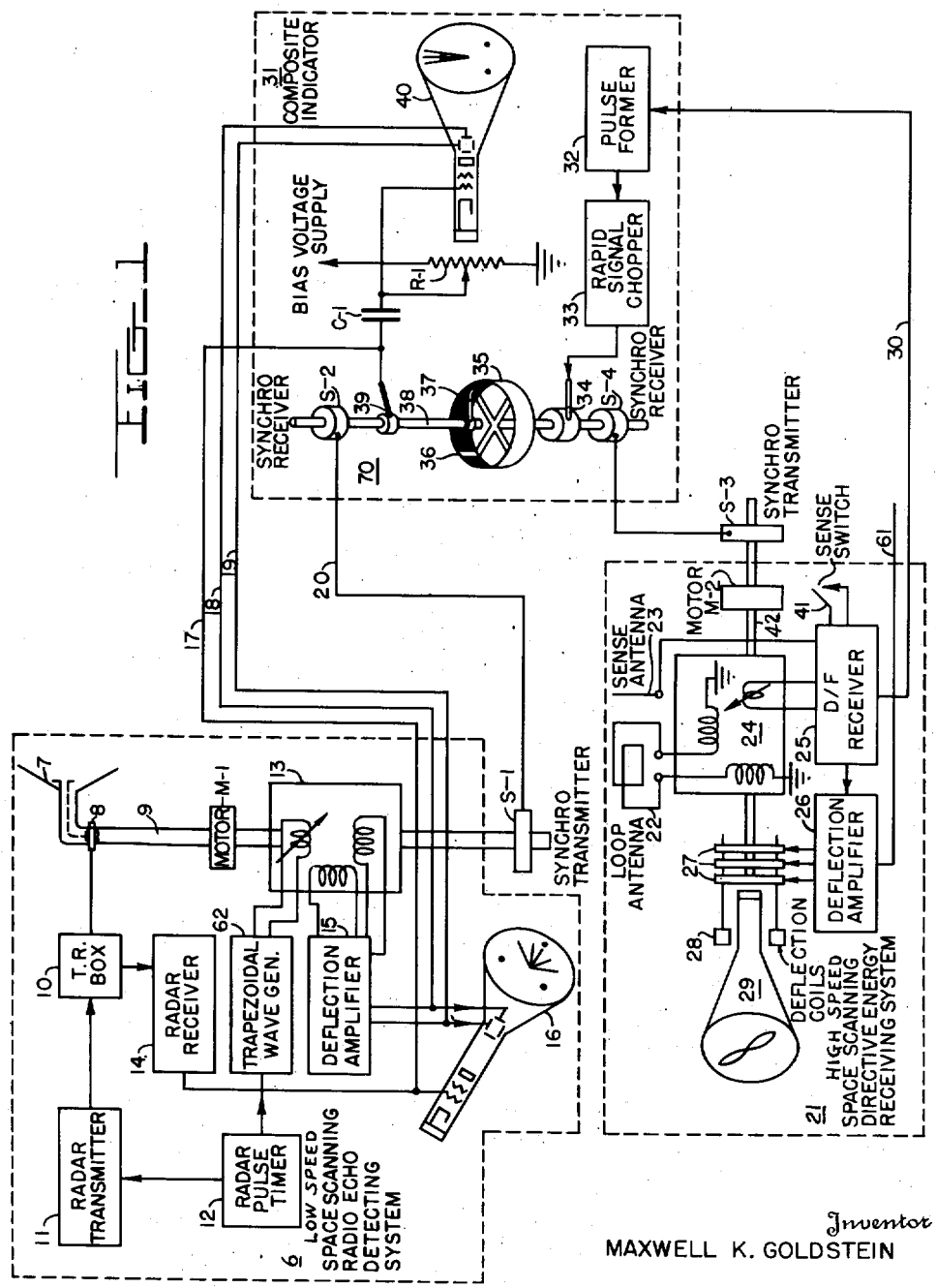
Inventor
MAXWELL K. GOLDSTEIN Sept. 29, 1953 M. K. GOLDSTEIN 2,654,085
DETECTOR SYSTEM
Filed March 26, 1946 4 Sheets-Sheet 2
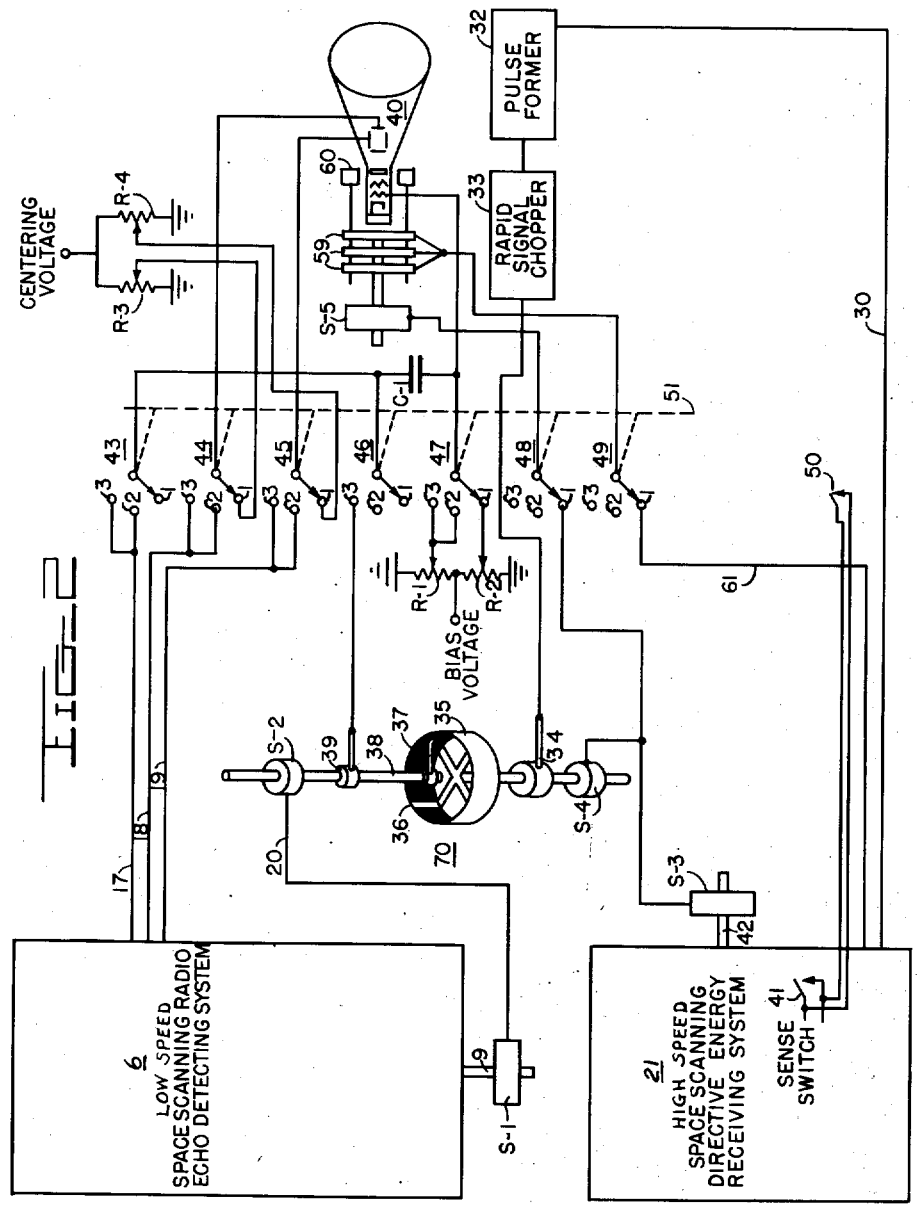
Inventor
MAXWELL K. GOLDSTEIN

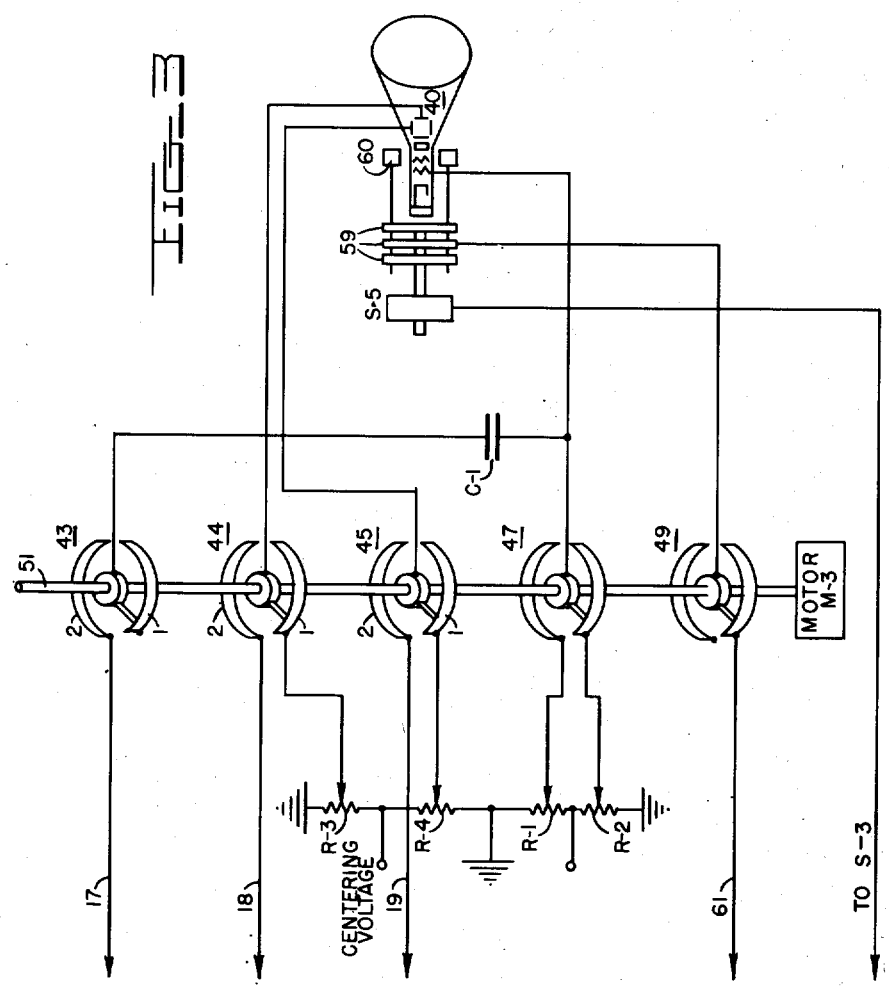

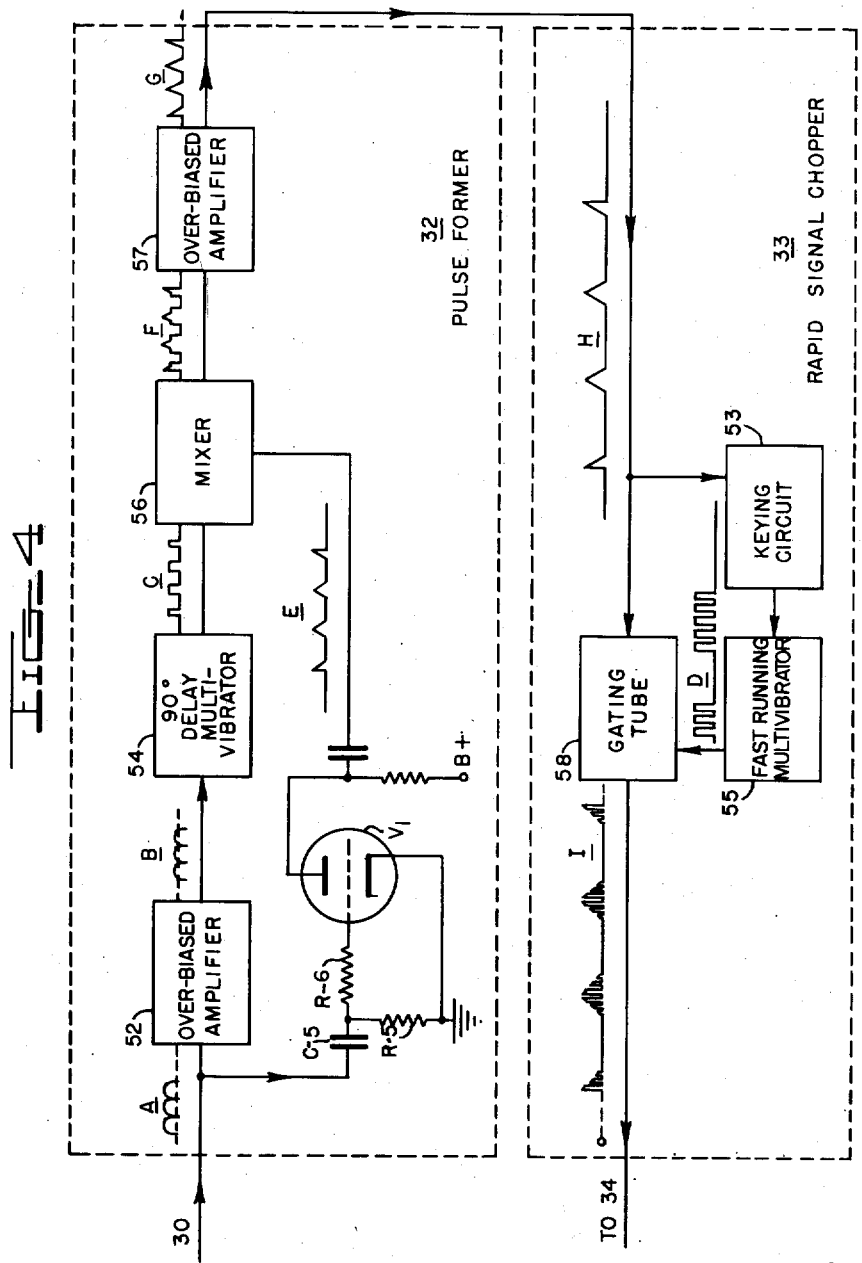

Patented Sept. 29, 1953

2,654,085

UNITED STATES PATENT OFFICE 2,654,085

DETECTOR SYSTEM

Maxwell K. Goldstein, Washington, D. C.

Application March 26, 1946, Serial No. 657,314

6 Claims. (Cl. 343—6)

(Granted under Title 35, U. S. Code (1952), sec. 266)

This invention relates to remote obstacle identification, and is particularly directed to the identification of obstacles located by space scanning radio echo detecting and space scanning directional energy receiving systems.

In a co-pending patent application by Joseph F. Novy, Serial No. 555,567, filed September 23, 1944, and issued May 27, 1952, as U. S. Patent No. 2,597,895, there is disclosed a remote location and identification system providing cathode ray tube indicating means simultaneously responsive to a remote obstacle detector and to a directive energy receiver, for indicating an obstacle emitting energy in such fashion as to render it distinguishable from an obstacle not emitting energy. As indicated therein, such a system can have important practical applications. At the same time, it may be improved from the standpoint of efficiency and economy of operation to use existing installations of a remote obstacle detecting system and a directive energy receiving system and with a simple attachment thereto, a means suitable to indicate simultaneously the outputs of both systems. It is further advantageous to arrange this indicating means so as not to interfere with the normal operation of the information supplying systems, this allows the directive energy receiving system to scan at a much greater rate than the obstacle detecting system, thus permitting more accurate bearing discrimination and establishing sensitivity to flash bearings. Since the cathode ray tube sweep in most types of remote obstacle detecting systems appears as a rotating radial line, and the indication from a radiating source upon a directive energy receiving system may also be shown as a radial line, the possible confusion arising from combining these indications in a single cathode ray tube is apparent. Therefore, it is a worthwhile improvement to reproduce the latter system's indication in a distinguishable form, such as a broken radial line. It is also desirable to incorporate means of avoiding the 180° ambiguity of the directive energy receiver.

It is, therefore, an object of this invention to provide cathode ray tube indicating means simultaneously responsive to a remote obstacle detector system and to a directive energy receiving system to indicate an obstacle emitting energy so as to be distinguishable from an obstacle not emitting energy.

It is another object of this invention to provide a cathode ray tube indicating means which may be simply attached to a remote obstacle detector system and a directive energy receiving system so as to reproduce the outputs of either or both without interfering with their independent operation in general, and more particularly, without requiring a correlation of the scanning operations of the respective antennas.

It is another object of this invention to provide a cathode ray tube indicating means responsive to a directive energy receiving system such that the responses occur on output nulls only if a signal is present, and such that said responses appear either as a straight radial line or a broken radial line as desired, and said line may be determined to eliminate the usual 180° ambiguity in such systems.

It is another object of this invention to provide cathode ray tube indicating means which may be simply attached to a remote obstacle detector system and a directive energy receiving system so as to reproduce the outputs of either or both, and at the same time, preserve the flash bearing characteristics of the directive energy receiving system.

Other objects and features of novelty of the invention will be made apparent by the following description and the annexed drawings, it being understood that such description and drawings are merely illustrative of the inventions and impose no limitations thereon.

In the drawings, Fig. 1 is a block diagram of one embodiment of the invention. Fig. 2 is a schematic diagram, partly in block, of a variant embodiment of the invention. Fig. 3 is a schematic diagram showing a modified arrangement for a portion of the circuit illustrated in Fig. 2 and Fig. 4 is a detailed block diagram of the rapid signal chopper and pulse former shown in Figs. 1 and 2. In all figures, the same reference characters are used to indicate identical elements.

Briefly, the identification system provided by this invention comprises a cathode ray tube indicator and associated equipment such that it may take antenna bearing and receiver signal information from a space scanning radio echo detection system and a space scanning directive energy receiving system without interfering with the independent operation of either.

Referring now in particular to Fig. 1 of the drawings, block 6 as enclosed by the dashed lines is a block diagram of a typical space scanning, radio echo detecting system. It is shown with a parabolic reflector antenna 7 arranged to be rotated in azimuth by means of motor M-1. A rotatable connection of any suitable type, to provide electronic continuity between the antenna and the rest of the system is indicated at 8. The T. R. box 10 connecting the radar transmitter 11 and receiver 14 to the antenna 7, serves to keep the transmitter energy out of the receiver and the received energy out of the transmitter. The timing circuit 12 is usually a multivibrator adapted to supply simultaneously a trigger to the transmitter 11 and to the trapezoidal wave generator 62 to thereby establish the necessary time relation between the transmitted pulse and the sweep. The trapezoidal voltage output of generator 62 is applied to the rotor coil of the sweep generator 13 which rotates synchronously with antenna 7. Also contained in generator 13 are a pair of stationary space quadrature inductances in which are induced, as said rotor coil revolves, saw-tooth voltages sinusoidally and cosinusoidally modulated. These voltages are applied to the deflection amplifier circuit 15 and thence to the quadrature deflection plates of cathode ray tube 16 thereby providing a radial sweep rotating in synchronism with antenna 7. Reflected echos of the transmitted pulse are detected and amplified in the receiver 14 and applied as an intensifying pulse to the control grid of the cathode ray tube 16. For reasons well known in the art, this intensifying pulse will appear as an illuminated spot on the cathode ray tube in a position relative to the range and bearing of the echo reflecting object.

Block 21, as enclosed by the dashed lines is a block diagram of a typical space scanning directive energy receiving system. It contains a cathode ray tube 29 indicating means for displaying the bearing of energy sources whose radiations are picked up by the loop antenna 22. Signals will appear as two narrow diametrically opposite loops whose position on the face of the tube 29 indicates the 0° and 180° bearing of the signal source. Rotary motion for space scanning is supplied by motor M-2 which turns shaft 42 (preferably at a speed greater than that of shaft 9). This shaft 42 turns the rotor of goniometer 24 thereby producing variable coupling to the resultant field caused by the goniometer stators. For any given signal one revolution of this rotor will produce at maximum rotor coupling two board maxima diametrically opposite, and at minimum maxima diametrically opposite, and at minimum rotor coupling two sharp nulls diametrically opposite and 90° displaced from said maximum. These signals are applied to the receiver circuit 25. About the neck of cathode ray tube 29 is a rotatable yoke 28 upon which are wound magnetic deflection coils. This yoke 28 is rotated by shaft 42 synchronously with the space scanning operation of goniometer 24. Signals in the receiver 25 are amplified in the deflection amplifier 26 and applied to the rotatable magnetic deflection coils through slip rings 27. The electron beam in tube 29 is deflected to the edge of the scope for no signal input or the minimum signals referred to above, but will return to the center during the maximum signals, thus appearing as two loops or radial lines 180° apart. This 180° ambiguity may be overcome by closing the sense switch 41. This switch excites the sense antenna 23. Antenna 23 is an omnidirectional antenna with a uniform field pattern, which when added to the aforementioned effective field pattern of loop antenna 22, will double the amplitude of one signal maxima, cancel the opposite maxima, and increase both nulls thereby providing a cardioid shaped pattern with only one null, which is broad. It is apparent, then, that the indication is reduced to one loop. For convenience, the sense switch may be arranged according to known methods to shift the cathode ray pattern 90° in order that the single loop will approximately coincide with one of the aforementioned two loops. The two loop indication produces much greater bearing discrimination, otherwise it would probably not be used.

Block 31 is a block diagram of the composite indicator which may be used to distinguish obstacles detected by block 6 which are radiating energy detectable by block 21, from obstacles detected by block 6 which are not radiating energy detectable by block 21. The antenna shaft 9 of block 6 is appended by the transmitter unit S-1 of an A. C. synchronous motor. The receiver of the unit is indicated at S-2 which is attached to and rotates shaft 38 of a circuit making device 70 synchronously with antenna 7 of the obstacle detecting system. A slip ring 39 and a sliding contact 37 are affixed to shaft 38 so that contact 37 maintains a fixed position relative to that of antenna 7. Similar to shaft 7, shaft 42, of the directive energy receivng system is appended by the transmitter unit S-3 of a second A. C. synchronous motor. The receiver unit S-4 of this second system rotates slip ring 34 and cylinder 35 of a circuit making device synchronously with shaft 42. Cylinder 35 is made primarily of insulating material but contains a conducting section 36 electrically connected to slip ring 34. This conducting section 36 therefore maintains a fixed position in azimuth relative to the goniometer rotor 24 of the directive energy receiving system. It becomes apparent then, that if slip rings 34 and 39 are inserted in an electrical circuit, the sliding contact 37 attached to and rotated synchronously with shaft 38, and the conducting section 36 of cylinder 35 may be so oriented that continuity will exist only when the obstacle detection system and the directive energy receiving system are scanning at the same bearing. These slip rings are inserted in the line 30 carrying information from the latter system to the composite indicator tube 40. Hence such information reaches cathode ray tube 40 only when it comes from the same bearing as information applied from antenna 7. Therefore, the rotating field set up around cathode ray tube 40 by connecting its deflection plates through lines 18 and 19 to the deflection amplifier 15 establishing a sweep for the remote indications from the obstacle detector will satisfy the sweep requirements for information supplied by the directive energy receiver. Furthermore, there is no required relationship between the rotation speeds of shafts 9 and 42, and in fact, shaft 9 need not be moving at all.

Information from receiver 14 in block 6 will appear on cathode ray tube 40 as an illuminated spot the same as on cathode ray tube 16. To this end tube 40 is biased by potentiometer R-1 such that it is not normally illuminated. A signal applied to its grid from receiver 14 will intensify a portion of the sweep and appear as a spot on tube 40.

For optimum representation, the output signals from the space scanning receiver 25 should be transformed into suitable pulses, such as by means of the pulse former 32 hereinafter to be described. These pulses are also used to intensify the sweep of tube 40, and may be passed through a rapid signal chopping circuit 33, also to be described hereinafter, for providing a broken line indication. From the chopping circuit 33 the space scanning receiver pulses are applied via sliding contact and a slip ring 34 to the conducting section 36 of the non-conducting cylinder 35. The conducting section 36 of cylinder 35 is rotated synchronously with the antenna system of the directive energy receiving system 21 by the synchro receiver S–4. Said pulses are picked up from said conducting section whenever the two antenna systems are in alignment by sliding contact 37, which is rotated on shaft 38 synchronously with the obstacle detecting antenna 7 by means of synchro receiver S–2. Said pulses are picked up from shaft 38 by slip ring and sliding contact 39 and thence applied to the grid of tube 40. But these pulses are ordinarily of longer duration than those from receiver 14 and instead of just illuminating a spot, intensify the whole trace for several degrees of rotation. If this intensifying signal occurs at the same bearing as a signal from receiver 14, the latter signal will not be obliterated but will be equally increased in intensity. The pulse from circuit 32 may be fed through the rapid signal chopper circuit 33 to render it more distinguishable from the trace when it appears on tube 40. As will be more fully described below, this is accomplished by interrupting the intensifying pulse from circuit 32 thereby causing an interrupted visible trace which will appear as broken radial lines.

The embodiment of Fig. 2, to which reference is now had, is essentially the same as that illustrated in Fig. 1, except there is included a three position ganged switch 51. Switch 51 permits the cathode ray tube indicator 40 to operate as a remote indicator for the directive energy receiving system only (position one), for the obstacle detecting system only (position 2) or to operate as the composite indicator shown in Fig. 1 (position 3). Switch section 43 is open in position 1 and in positions 2 and 3 it connects the receiver 14 of block 6 through cable 17 to the intensifying grid of cathode ray tube 40. Switch sections 44 and 45 connect the deflection amplifier of block 6 through cables 18 and 19 to the deflection plates of tube 40 thus supplying the rotating field. Said connections are completed in positions 2 and 3, in position 1 the deflection plates are connected to potentiometers R–3 and R–4 to center the electron beam of tube 40. Switch section 46 connects in position 3 only the receiver information of block 21 to the intensifying grid of tube 40 through the circuit making device discussed above in connection with Fig. 1. Switch section 47 connects the intensifying grid of tube 40 to suitable bias controls. In positions 2 and 3 connection is to potentiometer R–1 and in position 1 to potentiometer R–2. In order that position 1 of switch 51 may be operative, the rotating field in the cathode ray tube of block 21 must be duplicated in tube 40. This is accomplished by adding deflection coils, wound on a rotary yoke 60, to tube 40 and slip ring 59 to feed same. These coils are then turned in synchronism with those of tube 29 in Figure 1 by second synchro receiver unit S–5 driven by the second synchro transmitter S–3 on shaft 42. Switch section 48 energizes synchro receiver S–5 in position 1 and section 49 in position one energizes the rotation deflection coil 60 through cable 61 in parallel with the rotating deflection coil 28 of block 21. Switch 50 is in parallel with sense switch 41 and therefore simply constitutes a remote sense switch.

In Figure 3, to which reference is now had, the ganged selector switch 51 has been converted to a rotary type to illustrate an alternate method of providing a composite indication on cathode ray tube 40. If it be assumed that switch 51 in Figure 2 is alternately changed from position 1 to position 2, 25 or 30 times a second, the expected indications for both positions would appear simultaneously on cathode ray tube 40. This is because of the ordinary long persistency of the cathode ray tube screen and the human eye. It will be noted that this rapid switching provides a means of composite indication without the use of a circuit making device and still permitting independent operation of the obstacle detector system and the directive energy receiver system. The former system could be trained on a single obstacle and still permit 360° indications from the latter system to appear on tube 40. Switch 51 as seen in Figure 3 has position 3 removed and is transformed into a rotary switch driven by motor M–3. Therefore it can be switched between position one and position two as rapidly as desired. It is understood that this rapid switching operation could also be accomplished by electronic switching means which are known to the art.

For a detailed description of the operation of the pulse forming circuit 32 and the rapid signal chopping circuit 33, reference is now had to Fig. 4. The pulse forming circuit is fed by cable 30 which is the output of the directive energy receiver 25 of block 21 shown in Fig. 1. The signal supplied by cable 30 is indicated by oscillogram A which indicates the maximum and minimum responses of the directive energy receiver after being detected. Signal A is fed in parallel to an over-biased amplifier 52 and a time constant network consisting of capacitor C5 and resistance R5. The time constant network raises the base line of the voltage form to the average value of said voltage. This average voltage is applied to the control grid of an amplifier tube V1, through a grid clipping resistor R6. This resistor clips the maximum portions of the signal voltage to permit only the null portions of the signal voltage to be passed by the tube. The nulls will appear as positive pulses at the plate of said tube as indicated in oscillogram E. This voltage is of suitable form for application to the cathode ray tube, but is undesirable since it is derived from the null portion of the signal. It is desired that a minimum signal shall intensify the cathode ray tube only if it lies between two large amplitudes of the same signal. This is accomplished by an over-biased amplifier 52 which passes only the tops of the receiver output A somewhat as shown in oscillogram B. This voltage B is then passed through a multivibrator 54 where it is squared up and delayed 90° as shown in oscillogram C to coincide in phase with the positive pulses E. Voltages C and E are now added in mixer stage 56 so that the positive peaks ride on a pedestal as shown in oscillogram F. This voltage F is now applied to an over-biased amplifier stage 57 and the pedestal removed producing an output voltage G of the same form as E. However the signal of waveform E could not pass the amplifier 57 if it were not riding the pedestal C. The output voltage G of the pulse forming circuit 32 may be used to intensify the electron beam of the cathode ray tube or it may be put through the rapid signal chopper 33 so that it will appear as a broken radial line instead of a continuous straight line. This signal chopping may be accomplished by a fast running multivibrator 55, which is set in oscillation by the voltage pulses H applied through a keying circuit 53. The output of the multivibrator 55 as keyed by circuit 53 is a series of square wave groups shown in oscillogram D. These pulses would produce a broken radial line on cathode ray tube 40 but can be further improved to better indicate the center of the radial area so intensified with broken radial lines. This is done by feeding the multivibrator 55 output D and the pulse former 32 output H into a gating tube 58. This tube may be a multigrid tube of the pentagrid type with voltages D and H applied to different grids, thereby producing an output voltage I which is the positive pulse voltage H amplitude modulated by the output pulses from the pulse former 32.

The embodiments illustrated and described are for the purpose of disclosure, it will be understood that various modifications particularly in the matter of details, may be resorted to without departing from the scope of the invention.

The invention described herein may be manufactured and used by or for the Government of the United States of America for governmental purposes without the payment of any royalties thereon or therefor.

What is claimed is:

1. In combination, a radio echo obstacle detecting system scanning in space at a first rate, a directional energy receiving system scanning in space at a second rate, a cathode ray tube indicating means responsive to the first system and operative to indicate the spatial distribution of obstacles detected by said system, and circuit making means connected between said cathode ray tube indicating means and said second system operative to impress the output from said second system on said cathode ray tube indicating means when said two systems are oriented in azimuthal coincidence, whereby an obstacle transmitting energy may be identified.

2. In combination, a radio echo obstacle detecting system scanning in space at a first rate which may be zero, a directional energy receiving system scanning in space at a much higher rate, a cathode ray tube indicating means responsive to the first system and operative to indicate the spatial distribution of obstacles detected by said system, and circuit making means connected between said cathode ray tube indicating means and said second system operative to impress the output from said second system on said cathode ray tube indicating means when said two systems are oriented in azimuthal coincidence, whereby an obstacle transmitting energy may be identified.

3. In combination, a radio echo obstacle detecting system scanning in space at a first rate, a directional energy receiving system scanning in space at a second rate, a cathode ray tube indicating means responsive to the first system and operative to indicate the spatial distribution of obstacles detected by said system, circuit making means connected between said cathode ray tube indicating means and said second system operative to impress the output from said second system on said cathode ray tube indicating means when said two systems are in azimuthal coincidence, whereby an obstacle transmitting energy may be identified, and means periodically interrupting the output signal from said second system so as to render its indication on said cathode ray tube indicating means distinct from the indication produced in said first system.

4. In combination, a radio echo obstacle detecting system scanning in space at a first rate, a directional energy receiving system scanning in space at a second rate, a cathode ray tube indicating means responsive to the first system and operative to indicate the spatial distribution of obstacles detected by said system, and circuit making means connected between said cathode ray tube indicating means and said second system operative to impress the output from said second system on said cathode ray tube indicating means when said two systems are in azimuthal coincidence, whereby an obstacle transmitting energy may be identified, said circuit making means comprising two rotatable contacts connected in series with the connection from said second system to said cathode ray tube, one of said rotatable contacts being rotated synchronously with the scanning operation of the first system, the other being rotated synchronously with the scanning operation of said second system.

5. In a system to superimpose on one cathode ray tube the responses from a space scanning radio echo obstacle detecting system and a space scanning directional energy receiving system producing positive pulses corresponding to the maximum amplitudes of a signal, a negative pulse actuated circuit operable only between positive pulses, said circuit providing responses from said directional energy receiving system to said cathode ray tube only during the null between the two maximum amplitudes of a signal, whereby an obstacle transmitting energy may be identified.

6. In combination, a cathode ray tube indicating means, a radio echo obstacle detecting system scanning in space at a first rate which may be zero and producing a first rotary deflection field rotating at said first rate, a directional energy receiving system scanning in space at a second rate and producing a second rotary deflection field rotating at said second rate, a two position motor driven rotary switch alternately connecting the signal output and deflection field of one system and then the other system to said cathode ray tube indicating means at a third rate suitable to provide the simultaneous appearance of response indications from both said systems, whereby an obstacle transmitting energy may be identified.

MAXWELL K. GOLDSTEIN.

References Cited in the file of this patent

UNITED STATES PATENTS

| Number | Name | Date |
|---|---|---|
| 2,400,232 | Hall | May 4, 1946 |
| 2,405,231 | Newhouse | Aug. 6, 1946 |
| 2,412,669 | Bedford | Dec. 17, 1946 |
| 2,468,109 | Richardson | Apr. 26, 1949 |
| 2,489,279 | Finzer | Nov. 29, 1949 |
| 2,494,553 | Hansel | Jan. 17, 1950 |
| 2,502,447 | Frink | Apr. 4, 1950 |
| 2,563,998 | Foster | Aug. 14, 1951 |